US005342466A

United States Patent [19]

Eidson

[11] Patent Number: 5,342,466

[45] Date of Patent: Aug. 30, 1994

[54] DEVICE FOR APPLYING A STRIP OF SEALANT TO A SURFACE

[75] Inventor: Carson J. Eidson, Jonesborough, Tenn.

[73] Assignees: Don A. Harry, Jr.; Eugene O. Lilly, both of Abingdon, Va.

[21] Appl. No.: 985,436

[22] Filed: Nov. 30, 1992

Related U.S. Application Data

[63] Continuation of Ser. No. 721,237, Jun. 26, 1991, abandoned.

[51] Int. Cl.[5] .............................................. B32B 31/00

[52] U.S. Cl. ................................... 156/179; 156/579; 156/523; 156/577; 156/582; 156/574; 156/526

[58] Field of Search ............... 156/579, 523, 577, 582, 156/574, 526, 179

[56] References Cited

U.S. PATENT DOCUMENTS

| | | | |
|---|---|---|---|
| 3,463,694 | 8/1969 | Roshia | 156/577 |
| 4,090,914 | 5/1978 | Hauk et al. | 156/523 |
| 4,208,239 | 6/1980 | Lass | 156/579 |
| 4,555,298 | 11/1985 | Boucher | 156/579 |
| 4,707,202 | 11/1987 | Sweeny | 156/579 |

*Primary Examiner*—W. Gary Jones
*Assistant Examiner*—Mark DeSimone
*Attorney, Agent, or Firm*—Luedeka, Nelly & Graham

[57] ABSTRACT

A device for applying a strip of sealant from a roll to a surface comprises a shaft and a roller. The shaft has an end which is configured to be grasped by a user for pushing the device along a surface such as a roof panel, and the roller is rotatably supported on the other end of the shaft. The roll of sealant is supported on the shaft so as to enable the unwinding of the strip from the roll in response to a pulling force exerted on the free end of the strip. To use the device, the free end of the strip is first trained over the roller onto the surface with the strip between the roller and the surface. Thereafter, as the device is urged along the surface, the strip is unwound from the roll and pressed into engagement with the roof panel beneath the roller.

3 Claims, 3 Drawing Sheets

DEVICE FOR APPLYING A STRIP OF SEALANT TO A SURFACE

This is a continuation of application Ser. No. 07/721,237, filed Jun. 26, 1991, now abandoned.

BACKGROUND OF THE INVENTION

This invention relates generally to devices for applying strip sealant to surfaces and relates, more particularly, to devices for applying a weatherproofing lap sealant in strip form from a roll along the edge of a roof panel before another roof panel is placed in overlapping relation with the edge.

The sealant with which the invention is concerned is a relatively tacky substance which is provided as a strip wound into a roll about a hollow tube or core. The roll is generally disc-shaped in form and may be unwound by pulling the free end of the strip away from the remainder of the roll. To prevent the windings of the strip on the roll from adhering to one another, a strip of release paper typically extends along so as to cover one surface of the strip and is wound with the strip in the roll.

When utilized in the construction of roof panels wherein the edge of one roof panel is overlapped by the edge of another roof panel, the sealant strip is placed release paper-side-up adjacent an edge thereof, and then the release paper is peeled from the strip. The edge of the other roof panel is then placed in overlapping relationship with the edge of the one roof panel so that the sealant strip is sandwiched between the lapped edges.

Heretofore, lap sealant in strip form has been placed along a roof panel by sticking an end of the sealant strip to the panel adjacent one end thereof and then manually unwinding a section of the sealant from the remainder of the roll and pressing the unwound section into place along the panel. Such a prior art process, however, requires a great deal of care to ensure that the sealant is applied along a desired path and is relatively time-consuming and laborious.

It is therefore an object of the present invention to provide a new and improved device for applying a strip of sealant to a surface.

It is a further object of the present invention to provide a new and improved device for applying a lap sealant strip along the surface of a roof panel.

Still another object of the present invention is to provide such a device for applying lap sealant to a roof panel in a manner which does not require as much care to position the sealant along a desired path as does the aforedescribed prior art process and does not require as much time and effort to apply the sealant to the roof panel.

Yet another object of the present invention is to provide a device of the character which is uncomplicated in construction and effective in operation.

SUMMARY OF THE INVENTION

In general, the invention resides in a device for applying a sealant to a surface wherein the sealant is supplied as an elongate strip wound upon itself so as to provide a roll having a tail end adjacent the center of the roll and a leading end adjacent the periphery of the roll. The device comprises an elongated shaft structure having a length axis extending between a forward end and a rearward end, the rearward end being adapted to be operatively grasped by a user to move the device along the surface in the application of the sealant to the surface. A roller is disposed adjacent the forward end of the shaft and structure is provided for rotatably supporting the roller on the shaft for rotation about a roller axis oriented generally perpendicular to the length axis of the shaft. Structure is provided for rotatably supporting the roll of sealant on the shaft to enable the unwinding of the roll in response to the application of a pulling force upon the leading end of the strip. The structure for rotatably supporting the roll of sealant and the roll are situated on the shaft such that the strip may be unwound from the roll onto the surface by training the strip over the roller with the roller pressingly engaging the strip against the surface and moving the shaft along the surface so as to cause the roller to roll upon the strip pressingly engaged thereby against the surface while simultaneously exerting a pulling force upon the roll to advance the strip from the roll, over the roller and onto and against the surface. The shaft is of a length and configuration sufficient to enable a user to grasp the rearward end and move the device along the surface with the roller positioned upon the strip to apply the strip to the surface while the user is in a generally upright, walking position. Thus, the device of the invention enables the application of strip sealant from a roll with a minimum of effort and in less time than previously required by manual methods.

In accordance with one aspect to the invention, there is provided an applicator for applying a sealant along the surface of a roof panel wherein the sealant is supplied as an elongated strip wound about a hollow core onto a roll having a tail end adjacent the core and a leading end adjacent the periphery of the roll. The applicator comprises an elongated shaft having a length axis extending between a forward end portion and a rearward end portion of the shaft, the rearward end portion adapted to be grasped by a user for pushing the applicator along a roof panel. A roller is rotatably supported on the shaft adjacent the forward end portion for rotation about a roller axis oriented generally perpendicular to the length axis of the shaft. Structure is provided for rotatably supporting the roll of sealant on the shaft and guide structure is provided for guiding the strip from the roll to the roller so as to maintain a length of the strip approaching the roller from the roll along a path of movement substantially perpendicular to the roller axis. The length and configuration of the shaft is sufficient to enable a user to stand generally upright while holding the rearward end of the shaft and apply the strip of sealant to the roof panel along a path by training the leading edge of the strip over the roller and into contact with the roof panel with the roller atop the strip so as to pressingly engage the strip against the surface and thereafter moving the shaft and roller along the path with the roller atop the strip in contact with the roof panel causing the roller to exert a pulling force upon the roll to advance the strip from the roll to and over the roller onto the panel along the path. In this embodiment, the strip may be applied along a portion of the roof panel to be covered by a subsequent adjacent panel positioned in superposed overlapping relation to provide a continuous seal between the panels.

The above and other features and other advantages of the invention will now be further described with reference to the accompanying drawings in which:

DETAILED DESCRIPTION OF THE ILLUSTRATED EMBODIMENT

Figure 1:
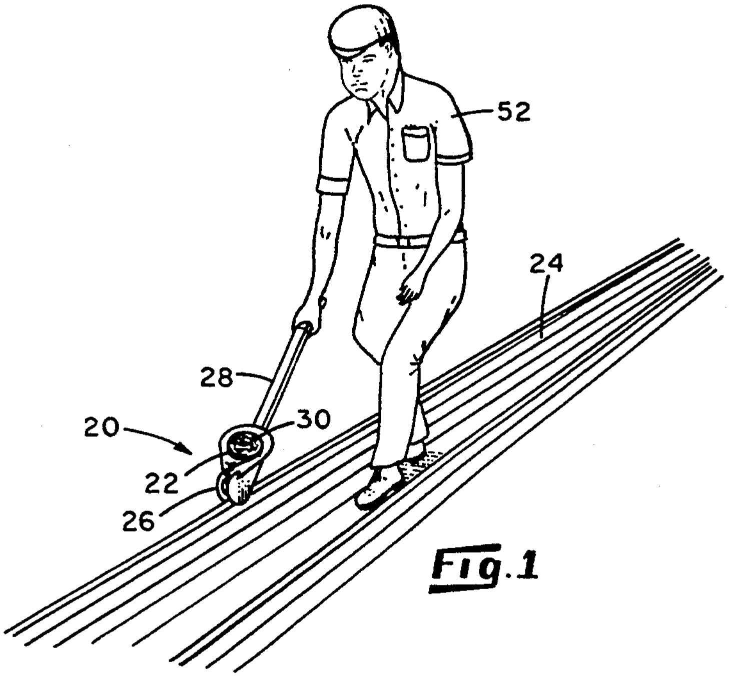
FIG. 1 is a perspective view of a device in accordance with the present invention shown being utilized to apply a strip of lap sealant along the surface of a roof panel.

Turning now to the drawings in greater detail, there is illustrated in FIG. 1 an embodiment of the device of the present invention, generally indicated at 20, being utilized for applying a sealant strip 22 along the surface of a ribbed roof panel 24. The device or applicator 20 as sometimes hereinafter referred to includes a roller 26 and a shaft-like member 28 with which the roller 26 is directed, i.e. pushed, along the roof panel 24. The sealant strip 22 is wound in a roll 30 which is, in turn, rotatably supported adjacent the lower end of applicator 20. During use of the applicator 20, the free end of the sealant strip 22 is trained over the roller 26 so as to engage the upper surface of the roof panel 24. The leading end of the strip 22, which is tacky and self-adhering, sticks to the surface of the panel 24. Thereafter, as the applicator 20 is pushed along the panel 24, the sealant strip 22 is unwound from the roll 30 onto the panel 24 and is pressed against the panel by the roller 26 which rotates with the unwinding strip, to thereby enable the application of the strip to the panel with a minimum of effort and in a fraction of the time required by previous methods.

Figure 2:
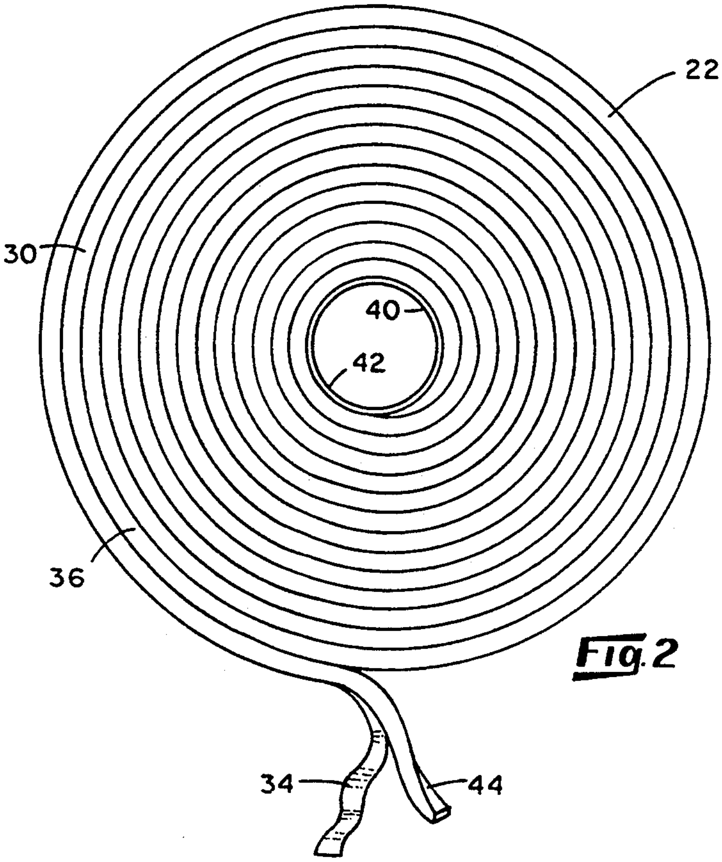
FIG. 2 is an elevational view illustrating one side face of a roll of lap sealant capable of being applied to a roof panel with the FIG. 1 device.
Figure 3:
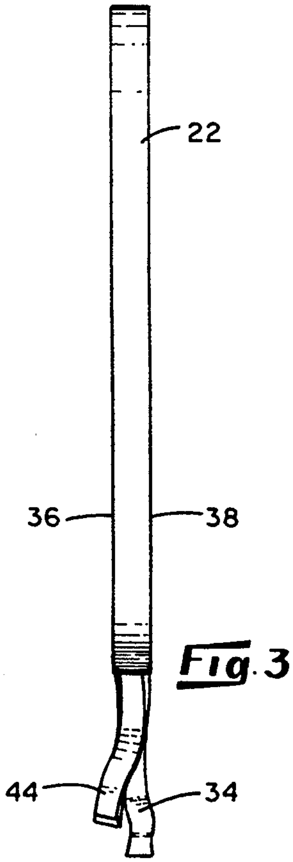
FIG. 3 is a side elevational view of the FIG. 2 roll as seen generally from the right in FIG. 2.

With reference now to FIGS. 2 and 3, there is illustrated a roll 30 of sealant strip 22 for application to the roof panel 24 with the applicator 20. The sealant strip 22 is relatively tacky and caulk-like in consistency which is well-suited for use as a sealing compound between the edges of overlapping roof panels. To prevent adjacent surfaces of the strip 22 from sticking to one another, a strip of release paper 34 may be applied to one surface of the strip 22 and wound with the strip 22 in the roll 30. Once the strip 22 has been placed exposed-side-down in adhering relationship with the roof panel 24, the release paper 34 may be removed from the strip 22 simply by pulling the paper 34 from the strip.

The roll 30 is disc-shaped having two opposite faces 36, 38 and a central opening 40 which is lined with a hollow core or tube 42, constructed, for example, of cardboard. In the depicted roll 30, the tube 42 is about 1.5 inches in diameter. The roll 30 further includes a free end 44 which may be pulled to unwind the strip. Although the strip may possess any of a number of alternative lengths, e.g. 30 feet, 40 feet or 50 feet, within the roll 30, the illustrated roll 30 includes about 30 feet of sealant. An example of a roll 30 of sealant 22 of the aforedescribed type is the modified isobutylene tripolymer available in strip-form on rolls under the trade designation CHEMSECO TC-95 from Chemseco of Kansas City, Mo.

Figure 4:
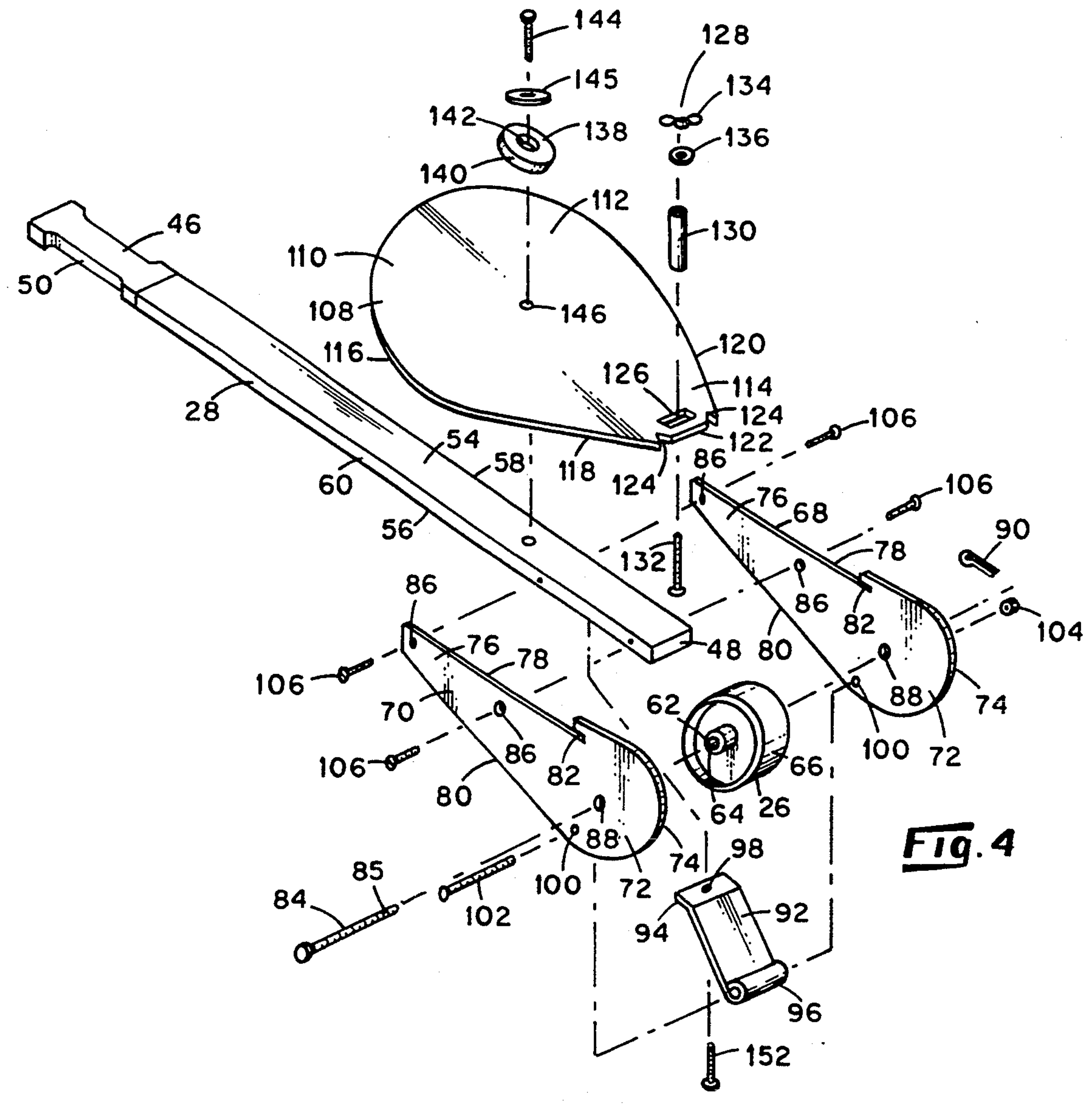
FIG. 4 is a perspective view of the FIG. 1 device, shown exploded.

As best shown in FIG. 4, the shaft member 28 of the applicator 20 is elongated in shape and has two opposite ends 46 and 48. One end 46 of the shaft 28 includes a handle section 50 which is somewhat rounded in cross section so that it may be comfortably grasped by the hand of a user 52 (FIG. 1). The remainder of the shaft 28 is generally rectangular in cross section so as to provide a flat upper side 54, as viewed in FIG. 4, a flat underside 56, and flat right and left sides 58, 60, respectively. The shaft 28 may be constructed of any of a number of suitable materials such as wood, plastic or metal. In a preferred embodiment, the shaft 28 is constructed of a hollow aluminum bar with a substantially square cross-section. The bar measures about 36.0 inches in length, is about 1.5 inches in width as measured between its right and left sides 58, 60. In this embodiment, the roller 26 of the applicator 20 is preferably about 2.5 inches in diameter and possesses a smooth cylindrical periphery 66 which is about 1.5 inches in width. As will be apparent herein, the width of the roller periphery 66 is at least as great as the width of the sealant strip 22 to be applied with the applicator 20. The roller 26 also includes a central hub 62 containing a through-opening 64. Although the roller 26 may be constructed of any of a number of suitable materials, the roller 26 of the depicted applicator 20 is constructed of a relatively hard plastic.

The roller 26 is rotatably supported on the shaft end 48 for rotation about an axis generally perpendicular to the length axis of the shaft 28. To this end, the applicator 20 of the depicted embodiment includes a pair of side plates 68, 70 attached to the right and left sides 58, 60 of the shaft 28 and between which the roller 26 is positioned. Each side plate 68 or 70 is substantially planar in form and includes a forward section 72 provided with a rounded edge 74 and a rearward section 76 provided with linear upper and lower edges 78, 80 which converge toward one another as a path is traced rearwardly along the plate 68 or 70. Each side plate 68 or 70 is provided with openings 86 adjacent its upper edge 78 for securement to the shaft 28 with screws 106 and is further provided with a central opening 88 in its forward section 72. When the side plates 68, 70 are secured to the remainder of the shaft 28 in a manner described herein, the openings 88 of the side plates 68, 70 are aligned with one another. The upper edge 76 of each side plate 68 or 70 is provided with a rearwardly-opening notch 82 for a reason which will be apparent herein.

To rotatably support the roller 26 between the side plates 68, 70, a headed pin 84 having a transversely-extending aperture 85 opposite its head end and a shaft diameter which is smaller than that of the hub opening 64 is directed through the aligned plate openings 88 and through the opening 64 of the roller hub 62 as shown in FIG. 4. A cotter pin 90 is positioned within the pin aperture 85 in the well-known manner to thereby secure the roller 26 between the side plates 68, 70.

With reference still to FIG. 4, the applicator 20 further includes a spacer member 92 through which the side plates 68, 70 are further connected to one another and for maintaining a fixed spacing between the side plates 68, 70. The spacer member 92 is formed from a single piece of sheet metal which is suitably folded at one end to forth an upper flange 94 and is rolled at its other end to provide a cylindrically-shaped sleeve section 96 having an opening along its length. For purposes of attaching the upper flange 94 to the shaft 28, the upper flange 94 is provided with an aperture 98, and for purposes of attaching the cylindrically-shaped sleeve section 96 between the side plates 68, 70, the side plates 68, 70 are provided with aligned openings 100, and a headed bolt 102 is directed in sequence through one plate opening 100, through the sleeve section 96 and then through the other plate opening 100. A nut 104 is then tightened upon the end of the bolt 102 to thereby secure the spacer member 92 and side plates 68, 70 between the nut 104 and the head of the bolt 102. Since the spacer member 92 serves to fix the distance that the side plates 68, 70 are spaced from one another and permit free rotation of the roller 26 between the side plates 68, 70, the width of the spacer member 92 is slightly larger than the greatest thickness of the roller 26.

The applicator 20 further includes a platform 108 upon which the sealant roll 30 (FIGS. 2 and 3) may be supported. As best shown in FIG. 4, the platform 108 includes a rearward section 110 providing an expansive planar support surface 112 upon which the roll 30 may be operatively positioned and a forward section 114 positioned adjacent the roller 26. In the depicted embodiment 20, the rearward section 110 is bounded by an arcuate edge 116, and the forward section 114 includes opposite side edges 118, 120 which converge toward one another as a path is traced forwardly along the platform 108. The side edges 118, 120 terminate at a forward edge 122 having a pair of notches 124 as shown in FIG. 3, and the forward section 114 further includes a transversely-extending slot 126 adjacent the forward edge 122 whose purpose will be apparent herein.

The applicator 20 additionally includes a post assembly 128 including a sleeve 130 having a central aperture therethrough and a headed carriage bolt 132 having a shank which is at least as long as the sleeve 130. The post assembly 128 is connected to the platform 108 as the shank of the bolt 132 is directed upwardly through the transversely-extending slot 126 of the platform 108 and the sleeve 130, and a wing nut 134 is tightened upon the end of the bolt 132. The sleeve 130 is thereby tightly secured between the platform 108 and the wing nut 134 so that its sides are maintained at generally a right angle with respect to the plane of the platform support surface 112. If desired, a washer 136 may be interposed between the sleeve 130 and the wing nut 134. The carriage bolt 132 has a shoulder adjacent its head which is square in cross section and which is closely received by the transversely-extending slot 126 for preventing the bolt 132 from rotating when received by the slot 126. As will be apparent herein, the slot 126 enables a shifting of the position of the post assembly 128 between desired positions across the forward edge 122 of the platform 108 as the wing nut 134 is loosened and the bolt 132 is slidably moved along the slot 126 between two positions.

With continuing reference to FIG. 4, the applicator 20 also includes a hub 138 associated with the platform 108 for aiding in the support of the sealant roll 30 when positioned upon the platform support surface 112. In this connection, the hub 138 includes a body having a cylindrical periphery 140 and a countersunk central opening 142 extending through the hub body. The hub 138 is secured to the platform 108 with a screw 144 which extends through an opening 146 formed in the rearward section 110 of the platform 108 and into the shaft upper side 54. If desired, a washer 145 may be interposed between the hub body and the head of the screw 144.

With the hub 138 joined to the platform 108 and shaft 128 in the aforedescribed manner, the hub 138 provides a protuberance which extends from the plane of the platform support surface 112. The hub 138 is sized to be accepted by the hollow tube 42 of the sealant roll 30 when the roll 30 is positioned upon the support surface 112 so that the face 36 (FIG. 3) of the roll 30 engagably overlies the support surface 112. Accordingly, the diameter of the hub 138 is no greater than that of the hollow tube 42. In the depicted applicator 20, the diameter of the hub 138 is about 1.9375 inches.

To assemble the components of the applicator 20 and with reference to FIG. 4, the platform 108 is placed in overlying relationship with the upper side 54 of the shaft 28 so that the forward section 114 of the platform 108 corresponds with the shaft end 48 and the hub 138 is placed upon the platform support surface 112 so that its central opening 142 is aligned with the shaft opening 146. The screw 144 is then inserted through the hub opening 142 and platform opening 146 and then threadably secured within the shaft 28 to tighten the hub 138 against the platform 108 and the platform against the shaft 28.

With the platform 108 secured to the shaft 28 as aforedescribed, the slot 126 of the platform 108 is positioned forwardly of the shaft end 48. Accordingly, the shaft opening 146 is spaced from the shaft end 48 so that when the platform 108 and screw 144 are secured thereto, the slot 126 is positioned forwardly of the shaft end 48. The post assembly 128 is then attached to the platform 108 by inserting the carriage bolt 132 through the slot 126 and positioning the sleeve 144, washer 138 and wing nut 134 upon the bolt 132 as aforedescribed.

The roller 26, spacer member 92 and side plates 68, 70 may be assembled in a unitary assembly and then attached as an assembly to the shaft 28. More specifically, the spacer member 92 may be secured to the side plates 68, 70 in the aforedescribed manner by directing the bolt 102 through the openings 100 of the side plates 68, 78 and sleeve section 96 of the spacer member 92 and then securing the nut 104 upon the bolt 102. The side plates 68, 70 are positioned so that the plate openings 88 are aligned with one another, and then the roller 26 is positioned between the plates 68, 70 so that the hub opening 64 is aligned with the plate openings 88. The pin 84 is then directed through the openings 88 and hub through-opening 64 and secured in place with the cotter pin 90.

The side plate/roller/spacer member assembly is then attached to the shaft 28 by directing the notches 82 of the side plates 68, 70 into interlocking relationship with the platform notches 124 and then directing screws 106 through the openings 86 provided in the side plates 68, 70 and into the right and left sides 58, 60 of the shaft 28. A screw 152 is then directed through the upper flange 94 of the spacer member 92 and into the shaft under side 56 as illustrated in FIG. 4 to secure the spacer member 92 directly to the shaft 28. The roller periphery 66 is maintained in a spaced relationship with the shaft end 48 so that when the plates 68, 70 and spacer member 92 are secured to the shaft 28 as aforedescribed, the roller 26 is permitted to rotate between the plates 68, 70 without obstruction from the shaft end 48.

Figure 5:
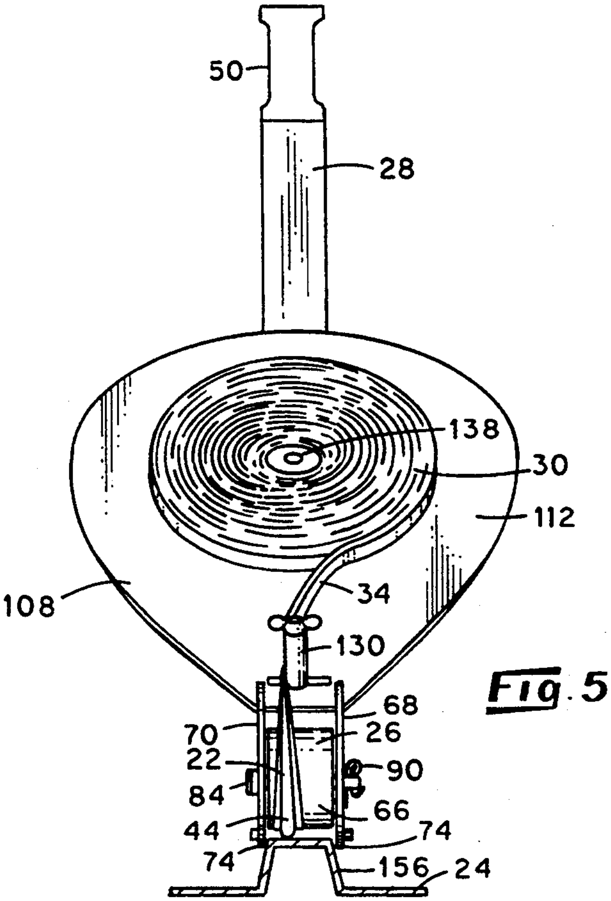
FIG. 5 is a front elevational view, shown partly in section, of the FIG. 1 device shown in a condition for applying lap sealant to a roof panel.
Figure 6:
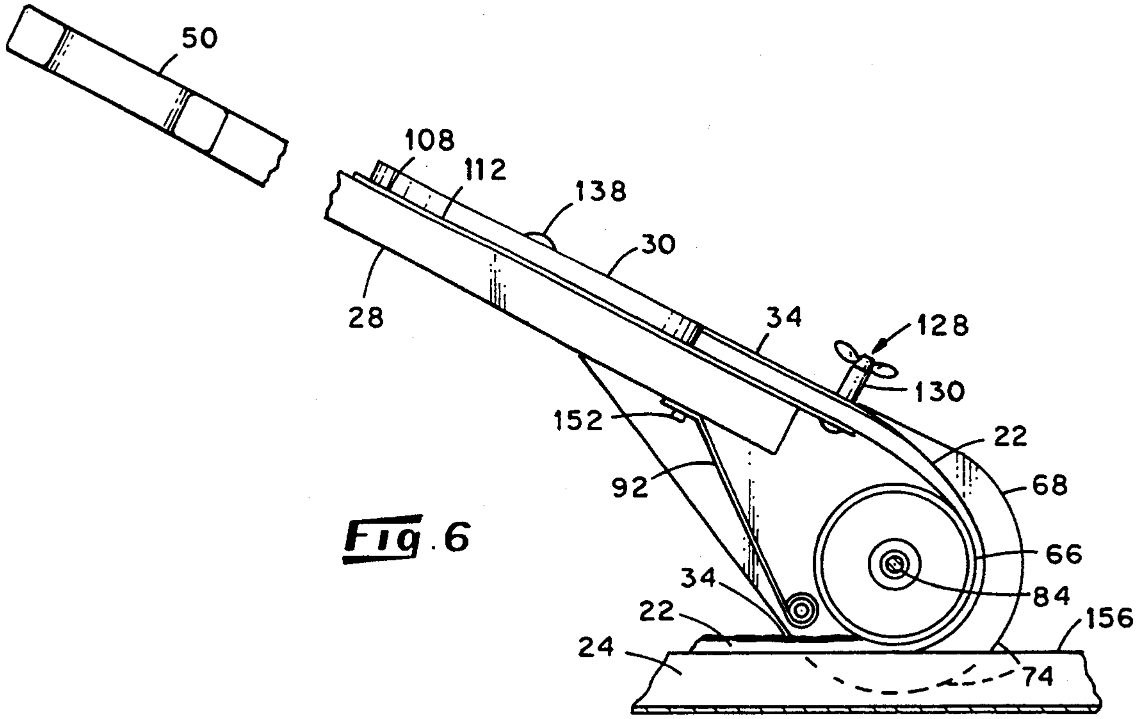
FIG. 6 is a side elevational view of the FIG. 1 device as seen generally from the left in FIG. 5.

To use the applicator 20 and with reference to FIGS. 1, 5 and 6, the sealant roll 30 is placed upon the platform support surface 112 so that its hollow tube 42 is positioned about the hub 138. During use of the applicator 20, the shaft 28 is held by the user 52 in a generally upright, walking position (FIG. 1) with the shaft 28 canted with respect to the vertical so that the roll 30 is maintained upon the platform 108 by the hub 138, facing generally upwardly. The free end 44 of the sealant strip is then routed past the sleeve 130 of the post assembly 128 and trained over the roller periphery 66 until the end 44 is situated under the roller 26. To prevent the strip 22 from adhering to the sleeve 130 and the roller periphery 66, the strip is turned so that the release paper 34 which extends along one surface of the strip is positioned against the sleeve 130 and the roller periphery 66 as the free end 44 is pulled to a location under the roller 26.

The free end 44 of the sealant strip is then placed upon the upper surface of the roof panel 24 with the roller 26 atop the surface of the strip 22 containing the release paper 34 so that the tacky surface of the tape is adheringly pressed against the panel by the roller. The free end 44 may be initially pressed against the roof panel 24 by holding the applicator 20 in the air with one hand and holding the free end 44 against the underside of the roller 26 with the other hand, and then lowering the strip and roller onto the roof panel 24. As the applicator 20 is subsequently pushed along the roof panel 24 with the free end 44 in adhering relationship with the roof panel, the roller 26 rolls on the upper surface of the strip 22 (containing the release paper 34) causing the strip 22 to be unwound from the roll 30 and pressed onto the panel as the roll 30 rotates about the hub 138 with the release paper-covered side of the tape 22 slidably moving past the sleeve 130. As the applicator 20 continues to be guided across the roof panel 24, a continuous trail of adhered sealant strip is left behind the applicator 20 and upon the panel 24 as illustrated in FIG. 6. Once the desired amount of sealant strip 22 has been applied to the roof panel 24, the strip 22 may be severed at the point of termination and the release paper 34 may be pulled from that portion of the strip which adheres to the panel 24. The upper side of the strip 22 is thereby exposed to the underside of another roof panel (not shown) subsequently placed in overlapping relationship with the roof panel 24.

An advantage provided by the applicator 20 relates to the ease with which the applicator 20 may be guided along a rib of the roof panel 24. In this connection and in a preferred embodiment, the rounded forward section 72 of each side plate 68 or 70 possesses a greater diameter than does the roller periphery 66 so that the rounded edges 74 of the forward sections 72 are positioned radially outwardly of the roller periphery 66. Consequently, as the roller 26 is rolled along the rib indicated 156 in FIG. 5 of the roof panel 24, the side plates 68, 70 are positioned on opposite sides of the rib 156 to facilitate the guiding of the roller 26 along the rib 156 and maintenance of the strip generally along a straight line in the center of the upper surface of the rib.

As the applicator 20 is guided along the roof panel rib 156 and as viewed in FIG. 5, the roll 30 rotates clockwise about the hub 138 and the release paper 38 and sealant strip 22 move past the right side of the sleeve 130. It will be understood, however, that for use of the applicator 20, the sealant roll 30 may be positioned upon the hub 138 for unwinding in the counterclockwise direction. The release paper 38 and strip 22 in such an alternative instance would be routed past the right side of the sleeve 130 so that the release paper 38 engages the right side of the sleeve 130.

As mentioned earlier, the transversely-extending slot 126 of the platform accommodates an adjustment in the position of the post assembly 128 along the length of the slot 126. More specifically and with reference still to FIG. 5, the position of the strip 22 on the roller periphery 66 is dictated by the position of the post assembly 128 along the length of the slot 126. Therefore, by adjusting the position of the post assembly 128 along the length of the slot 126, the position of the strip 22 on the roller periphery 66 can be shifted rightwardly or leftwardly as desired while effecting a rightward or leftward shifting of the trail of sealant strip 22 along the roof panel rib 156. If it is desired that the sealant tape be positioned along the center of a rib, such an adjustment of the post assembly position may be necessary after pushing the applicator 20 a relatively short distance along the panel 24. In addition, the post assembly 128 enables feeding of the strip 22 from the roll 30 to the roller 26 so that the ¼ turn twist of the strip 22 between the roll 30 and the roller 26 (see FIG. 5) occurs in the space between the front edge 122 and the roll 30 along a line perpendicular to the rotational axis of the roller 26, which is an advantageous method of unwinding the strip.

It will be understood that numerous modifications and substitutions can be had to the aforedescribed embodiment without departing from the spirit of the invention. Accordingly, the aforedescribed embodiment is intended for purposes of illustration, and not as limitation.

I claim:

1. An applicator for applying a lap sealant tape along a rib of a ribbed proof panel wherein the lap sealant tape is wound about a hollow core into a roll having two opposite side faces and has a side which is covered by a strip of release paper for preventing the windings of the tape from adhering to one another within the roll, the tape further including an end which can be pulled from the remainder of the roll to unwind the tape therefrom, the applicator comprising:
   - an elongated shaft having a forward end portion and a rearward end portion, the rearward end adapted to be grasped by a user for pushing the applicator along the rib of a ribbed roof panel;
   - a roller having a periphery and which is journaled to the shaft at the forward end thereof so that as the applicator is pushed along the rib of the roof panel, the periphery of the roller rolls along the surface of the roof panel rib;
   - a pair of side plates arranged in parallel relation on opposite sides of the roller adjacent to the forward end of the elongated shaft for positioning on opposite sides of the rib of the roof panel for capturing the rib between the side plates when the roller is positioned upon the surface of the rib so that when the applicator is pushed therealong, the side plates maintain the roller upon the rib and guide the movement of the roller along the rib, each one of said side plates having a forward section provided with a rounded edge having a greater diameter than does the roller periphery so that the rounded edges of the forward sections are positioned radially outwardly of the roller periphery, said side plates being positionable on opposite sides of the rib to facilitate guiding of the roller along the rib and maintenance of the tape along a straight line in the center of the upper surface of the rib;

a platform attached to the elongate shaft adjacent the forward end thereof for providing a planar support surface upon which the roll of sealant tape is positionable so that when the roll is positioned upon the platform, one side face of the roll slidably engages the support surface;

a hub associated with the platform providing a protuberance extending from the plane of the support surface and which is accepted by the hollow core of the tape roll when the tape roll is place upon the support surface as aforesaid for maintaining the tape roll upon the platform and so that the tape roll is permitted to be rotated about the hub with said one side face of the roll slidably engaging the support surface; and a post attached to the platform so that the sides of the post extend at generally a right angle from the plane of the support surface so that when the tape roll is placed upon the support surface as aforesaid, the end of the sealant tape is directed in sequence past one side of the post and over the periphery of the roller to the surface of the roof panel rib so that the release paper covering one side of the tape engages the one post side and the roller periphery and the end of the tape is adhesively secured to the roof panel surface, and the roller is pushed along the roof panel rib so that the side plates are moved along opposite sides of the roof panel rib, the tape is unwound from the roll, is moved past the post and across the roller periphery as the tape roll rotates about the hub, and is pressed into engagement with the surface of the roof panel rib beneath the roller periphery.

2. The applicator as defined in claim 1 further comprising means for attaching the post to the platform in a manner accommodating an adjustment in the lateral position of the post relative to the roller to accommodate an adjustment in the lateral position of the path followed by the sealant tape across the roller periphery during use of the applicator.

3. The applicator as defined in claim 2 wherein the platform includes a transversely-extending slot adjacent the roller and the means for attaching the post to the platform includes a bolt which extends through the slot and a nut which is tightly and threadable received on the bolt to accommodate a repositioning of the post along the length of the slot by loosening the nut and shifting the bolt along the length of the slot.

* * * * *

UNITED STATES PATENT AND TRADEMARK OFFICE

CERTIFICATE OF CORRECTION

PATENT NO. : 5,342,466

DATED : August 30, 1994

INVENTOR(S) : Carson J. Eidson

It is certified that error appears in the above-indentified patent and that said Letters Patent is hereby corrected as shown below:

Column 8, Line 36, delete "proof" and insert --roof--.

Signed and Sealed this

Fifteenth Day of November, 1994

*Attest:*

BRUCE LEHMAN

*Attesting Officer*

*Commissioner of Patents and Trademarks*